United States Patent [19]

Capitani et al.

[11] Patent Number: 5,512,311
[45] Date of Patent: Apr. 30, 1996

[54] STARCH BASED LIPID MIMETIC FOR FOODS

[75] Inventors: Teresa A. Capitani, Clark; Peter Trzasko, Plainsboro; James P. Zallie, Hillsborough; William R. Mason, Somerville, all of N.J.

[73] Assignee: National Starch and Chemical Investment Holding Corporation, Wilmington, Del.

[21] Appl. No.: 333,111

[22] Filed: Nov. 1, 1994

Related U.S. Application Data

[63] Continuation of Ser. No. 918,344, Jul. 21, 1992, abandoned.

[51] Int. Cl.$^6$ ........................................ A23D 7/00
[52] U.S. Cl. ........................ 426/601; 426/578; 426/661; 426/804
[58] Field of Search .................................. 426/661, 578, 426/603

[56] References Cited

U.S. PATENT DOCUMENTS

| | | | |
|---|---|---|---|
| 3,300,318 | 1/1967 | Szczesniak et al. | 99/144 |
| 3,369,910 | 2/1968 | Ganz et al. | 99/139 |
| 3,962,465 | 6/1976 | Richter et al. | 426/48 |
| 3,986,890 | 10/1976 | Richter et al. | 127/38 |
| 4,308,294 | 12/1981 | Rispoli | 426/603 |
| 4,510,166 | 4/1985 | Lenchin et al. | 426/565 |
| 4,536,408 | 8/1985 | Morehouse et al. | 426/250 |
| 4,562,086 | 12/1985 | Smolka et al. | 426/578 |
| 4,596,715 | 6/1986 | Ballard et al. | 426/573 |
| 4,726,957 | 2/1988 | Lacourse et al. | 426/660 |
| 4,865,867 | 9/1989 | Platt | 426/603 |
| 4,911,946 | 3/1990 | Singer et al. | 426/658 |
| 4,971,723 | 11/1990 | Chiu | 252/315.3 |
| 4,981,709 | 1/1991 | Furcsik et al. | 426/565 |
| 4,990,355 | 2/1991 | Gupta | 426/603 |
| 5,051,271 | 9/1991 | Iyengar et al. | 426/658 |
| 5,089,171 | 2/1992 | Chiu | 252/315.3 |
| 5,094,872 | 3/1992 | Furcsik et al. | 426/578 |
| 5,110,612 | 5/1992 | Quarles et al. | 426/548 |

*Primary Examiner*—Carolyn Paden
*Attorney, Agent, or Firm*—Margaret B. Kelley

[57] ABSTRACT

A non-gelling starch derivative is suitable for use as a lipid mimetic in food. In aqueous dispersions of 1–50%, by weight, the starch derivative does not gel and has a fatty or oily mouthfeel throughout the temperature range from 0° to 100° C. The starch derivative may be prepared from dextrins, various converted starches and substantially non-crosslinked base starches. Preferred materials are hydroxypropyl starch ether derivatives having a d.s. of 0.15 to 0.70.

30 Claims, No Drawings

STARCH BASED LIPID MIMETIC FOR FOODS

This is a continuation of application Ser. No. 07/918,344, filed Jul. 21, 1992 entitled STARCH BASED LIPID MIMETIC FOR FOODS, now abandoned.

BACKGROUND OF THE INVENTION

This invention relates to a non-gelling starch derivative suitable for use as a lipid mimetic in foods. The starch derivative is characterized by a fatty or oily mouthfeel in aqueous dispersions of about 1 to 50%, by weight of starch, at 0° to 100° C.

Although the non-gelling starch derivatives of this invention are particularly useful in formulating low- or no-fat salad dressings, the starch derivatives may be used in a variety of reduced fat products including such foods as margarines and butter substitutes, low-fat spreads, puddings, sauces, imitation mayonnaise, gravies, soups, frozen desserts, dairy products, baked goods, imitation peanut butter and peanut spreads, frostings and icings, and lowfat cheese products.

In recent years, food manufacturers have worked to develop technology for reducing the lipid and caloric content of processed foods. The genesis of this technology is the growing consumer awareness of the nutritional value and caloric content of foods, and heightened consumer desire to reduce overall fat content of the diet, as well as to reduce or maintain body weight by selection of low-fat or low-calorie foods.

Because starch has a caloric content of only 4 Kcal/g and lipid has a caloric content of 9 Kcal/g, research efforts have been directed towards modifying functional and organoleptic properties of starch so that the modified starch may be used as a lipid mimetic in foods.

U.S. Pat. No. 4,510,166, issued Apr. 9, 1985, to Lenchin, et al., discloses converted starches that are suitable for use in fat replacement systems. These starches are converted to a DE (dextrose equivalent) of less than 5 and have certain specified hot flow viscosities as well as a minimum gel strength when dispersed in water at 10 to 50% solids.

U.S. Pat. Nos. 3,962,465, issued Jun. 8, 1976, and 3,986,890, issued Oct. 19, 1976, to Richter, et al., disclose processes for treating starch with enzymes so as to convert the starch and prepare a starch hydrolysate for use in foods. The hydrolysate has a DE of 5 to 10 and forms a gel when dispersed in water, cooked and cooled.

U.S. Pat. No. 5,110,612, issued May 5, 1992, to Quarles, et al., discloses bulking agents suitable for replacing sucrose in foods. These bulking agents comprise hydrolysates of hydroxypropyl starch ether derivatives, characterized in that at least 15% of the hydrolysate consists of a starch polymer having a degree of polymerization (DP) of 2–6. The hydrolysate has a DE of about 20 to 45.

U.S. Pat. No. 3,369,910, issued Feb. 20, 1968, to Ganz, et al., discloses particular hydroxypropyl starch ether derivatives that are used to provide stable thickening effects in foods that are subjected to freeze/thaw cycles and other types of temperature cycling (e.g., cooking and cooling). These starch derivatives preferably have a degree of substitution ("M.S." or average number of moles of reagent per anhydroglucose unit) of about 0.15 to 0.21.

U.S. Pat. No. 4,981,709, issued Jan. 1, 1991, to Furcsik, et al., discloses low or reduced fat foods that are prepared with hydroxypropyl ether derivatives of high amylose starch (starch having at least 40% amylose), which are non-crosslinked and which have a degree of substitution of at least 0.04.

U.S. Pat. No. 4,536,408, issued Aug. 20, 1985, to Morehouse, et al., discloses a low-fat, butter-like spread prepared with a non-gelling starch hydrolysate having a DE of about 4, and no greater than 25. The non-gelling starch hydrolysate may be used at 15 to 35%, by weight, of the spread to provide a 50% fat reduction in the spread.

Several workers have recommended particular starch-based materials for use in reduced fat salad dressing products. These products include mayonnaise type products as well as traditional, liquid or spoonable salad dressings.

U.S. Pat. No. 3,300,318, issued Jan. 21, 1967, to Szczesniak, et al., discloses a low-oil, cream-style salad dressing that is prepared using 3 to 10% gelatinized starch having less than 25% amylose. This dressing must be prepared to contain certain alginate gums and glycerol so that a salad dressing product containing 50 to 70% water may be manufactured and consumed in place of the traditional product which contains 70 to 80% oil.

U.S. Pat. No. 4,596,715, issued Jun. 24, 1986, to Ballard, et al., discloses a dry mix product for use in preparing a liquid, low-oil salad dressing. This dry mix contains a pregelatinized, acid-stable starch, preferably a waxy maize starch that has been modified. The starch is selected so that a consumer can readily prepare the dressing by shaking the dry mix with water and small amounts of oil.

U.S. Pat. No. 4,562,068, issued Dec. 31, 1985, to Smolka, et al., discloses a mayonnaise-type salad dressing and certain starches that are useful in preparing such a salad dressing. These starches are cross-linked common starches that have been derivatized to contain a substitution level of 2.0 to 3.5% ether substituent. The modified starch is characterized by certain levels of shear resistance and shear resilience and by certain minimum gel strength characteristics.

Notwithstanding the many contributions made to date in the field of low or reduced fat foods, food manufacturers persist in their requests for modified starches having desirable oily or fatty mouthfeel characteristics in aqueous dispersions.

SUMMARY OF THE INVENTION

This invention provides a non-gelling starch derivative suitable for use as a lipid mimetic in foods, characterized in aqueous dispersions of 1–50%, by weight of the starch derivative, by a fatty or oily mouthfeel throughout the temperature range from 0° to 100° C. The starch derivative may be prepared from dextrins, various converted starches and substantially non-crosslinked base starches.

Preferred materials are hydroxypropyl starch ether derivatives having a degree of substitution of about 0.12 to 0.70. Converted starches are preferred.

These starch derivatives may be used to replace from about 0.01 to 100%, by weight, of the lipid in a food. The starch derivative preferably is converted to a dextrose equivalent of less than 5 and preferably is solubilized (e.g., pregelatinized) and dispersed in water prior to, or during, preparation of food having a reduced lipid content.

The starch derivatives are useful in manufacturing liquid, flowable or spoonable reduced fat foods, such as salad dressings, margarine and butter substitutes, low-fat spreads, puddings, sauces, imitation mayonnaise, gravies, soups, frozen desserts, dairy products, baked goods, imitation peanut butter and peanut spreads, frostings and icings, and low-fat cheese products.

DESCRIPTION OF THE PREFERRED EMBODIMENTS

The starch which may be modified for use as a lipid mimetic may be derived from any source, including corn, potato, sweet potato, wheat, rice, sago, tapioca, waxy maize, waxy rice, pea, quinoa, sorghum, and the like. Also useful are high amylose (i.e., at least 40% amylose) corn and pea starch hybrids, provided that the high amylose starch is characterized by a liquid, non-gelling, lipid texture in aqueous dispersion. The high amylose starch may be highly derivatized (e.g., treatment with at least 12% reagent) or converted (e.g., to a reducing sugar content of 1.1 to 3.9%) and derivatized to provide a non-gelling starch. The starch derivatives useful as lipid mimetics may be prepared from conversion products derived from any of the above base starches, including fluidity or thin-boiling starches prepared by oxidation, alpha-amylase (or other alpha-1,4-D-glucosidase) enzyme-conversion, mild acid hydrolysis or mild heat dextrinization. Although non-crosslinked starches are preferred, a slight amount of crosslinking is acceptable.

Suitable starches must be derivatized to a degree of substitution (d.s.) of at least 0.06, so that the starch derivative is stable, i.e., does not gel in aqueous dispersion. In addition to being non-gelling, the starch derivative also should be in liquid form or flowable at 1 to 50% starch solids (depending upon conversion level) in aqueous dispersion. Such starch derivatives include ether and ester derivatives that are known in the art.

Suitable starches preferably are solubilized, and most preferably are pregelatinized starches (a pre-cooked, cold-water-swelling starch) and fluidity starches converted by oxidative treatment, mild acid degradation, enzymatic conversion or heat dextrinization, or any one of several methods that are well known in the art. See, e.g., M. W. Rutenberg, "Starch and Its Modifications", pp. 22–36, in *Handbook of Water-Soluble Gums and Resins*, R. L. Davidson, Editor, McGraw-Hill, Inc., New York, NY, 1980; and U.S. Pat. No. 4,726,957, to Lacourse, et al. (enzyme-conversion). A combination of one or more of the conversion techniques may be used. Typically the conversion is carried out before derivatization or crosslinking of the starch, but it may be carried out in the reverse order. Starches used as lipid mimetics herein are preferably acid-converted or oxidatively converted to a water fluidity (WF) of about 20 to 80, more preferably 30 to 65. Preferred enzyme-converted starches have a DE of no more than 5, preferably a DE of about 1–3.

In preparing the starch derivative for use as a lipid mimetic herein, any method known in the art for preparing starch derivatives may be used. One skilled in the art will recognize that a greater degree of substitution is desirable in starches having a higher amylose content so as to maintain the non-gelling characteristic of the starch in aqueous dispersion. Because the starch derivatives are intended for use in food systems, the derivatives that have been approved by the government regulatory agencies for use in foods are preferred for use herein. For example, reagents including propylene oxide, acetic anhydride, octenyl succinic acid anhydride, and the like are preferred reagents for preparing starch derivatives in the United States.

The hydroxypropyl starch ether derivative that is prepared by reacting starch with propylene oxide is preferred for use herein. In order to obtain a non-gelling starch derivative, it is preferred that the derivative have a d.s. of at least 0.06 to 0.18, depending upon the starch source, reagent and degree of conversion. To obtain a highly desirable oily or fatty mouthfeel, it is preferred that the starch derivative have a d.s. of at least 0.12, preferably 0.15 to 0.70.

If the starch derivative is to be used in foods having delicate flavor systems, it may be desirable to purify the modified starch prior to use in foods. Reaction impurities and byproducts or other starch off-flavors and off-colors may be removed by dialysis, filtration, ion exchange processes, centrifugation, steam stripping, carbon filtration, bleaching or a combination thereof, or any other method known in the art for purifying, isolating and recovering starch. In a preferred embodiment the starch derivative is steam-stripped, and, optionally, bleached.

The steam stripping process removes undesirable flavors and odors. It comprises the steps of:

(i) dispersing the starch at 1 to 40% solids in an aqueous media, (ii) feeding the starch dispersion into a steamstripping apparatus, (iii) applying a current of steam to remove undesirable flavors and odors, and (iv) separating the steam bearing the undesirable flavors and odors from the starch.

In the above process, a slurry or a dispersion of starch is permitted to flow down a column packed with inert solid support against a current of culinary-grade steam. Although a counter current of steam is preferred, any method of passing steam through the starch slurry or dispersion may be used. The steam volatilizes and carries away many of the flavor compounds, and their precursors, that are known to cause off-flavors (e.g., corn-like, beany, musty, burnt, earthy, etc.) in starch. The steam carrying its complement of flavor compounds is removed from the top of the column and condensed. The purified starch slurry or dispersion is recovered from the steam, preferably at the bottom of a column. The process is preferably continuous, but may be performed in batch operations.

To maintain an efficient column purification process, the steam must be maintained as the continuous phase and "flooding" of the column by excess feed material must be avoided. Various types of suitable process conditions and equipment designs are known in the art and described in publications such as *Perry's Chemical Engineer's Handbook*, 6th Edition, 1984, McGraw Hill Book Company, New York, N.Y., Chapter 18.

Although a variety of temperature and pressure ranges for the feed, the steam and the column, or other suitable apparatus, may be selected to complement the starch raw material and the intended product, conditions are broadly determined by whether the product is to be in water-soluble or insoluble form. For the water-soluble product, column steam pressure may range from 5 to 300 psig, preferably 10 to 40 psig, feed temperature from 55° to 200° C., preferably 80° to 200° C., and steam temperature from 55° to 200° C., preferably 115° to 140° C. For the insoluble product, column pressure under vacuum may range from −5 to −14.5 psig, preferably −10 to −14.5 psig, feed temperature from 25° to 80° C., preferably to 55° to 80° C., with a steam flow rate of 15 to 2,500 lbs/hour/ft$^2$, preferably 150 to 1,500 lbs/hour/ft$^2$. The soluble product may be steam-stripped at atmospheric pressure; the insoluble product must be steam-stripped at less than atmospheric pressure, preferably under a −5 to −14.5 psig vacuum, so as to avoid cooking the starch or gum and producing a fully dispersed or a soluble product.

The rate of feed may range from 0.03 to 3.75 gallons/minute/square foot of cross-sectional area of the apparatus (gal/min/ft2), preferably about 3.0 gal/min/ft$^2$, for a 1 to 40% solids slurry or dispersion. Suitable feed rates will vary depending upon the scale of the operation (e.g., laboratory vs. manufacturing scale), the packing materials, steam temperature and pressure and the viscosity and other rheological characteristics of the starch raw material in a slurry or dispersion. For exampled on a laboratory scale apparatus using a glass column ranging from 10.2 cm (4") in diameter× 91.4 cm (36") in height to 15.2 cm (6") in diameter×304.8 cm (120") in height, a rate of feed from 0.03 to 1.0 gal/min/ft$^2$ is suitable.

The viscosity of the feed material should be adjusted to less than 300 cps at the operating temperature of the column, preferably less than 100 cps at the column temperature, and most preferably 1 to 10 cps at column temperature. At a flow rate of about 3.0 gal/min/ft$^2$, and with steam at 80° to 200° C. and 10 to 40 psig, the feed solids content of a soluble starch hydrolysate dispersion is preferably 15 to 25%. For a higher molecular weight, more viscous soluble polysaccharides, such as fully dispersed high amylose corn starch, the solids content of the feed is preferably 10 to 20% at a feed flow rate of 2.0 gal/min/ft$^2$ and steam at 80° to 200° C. and 10 to 40 psig. The practitioner will recognize that lower flow rates and lower percentages of solids in the feed will not be economical, whereas higher flow rates and solids may exceed the capacity of the steam-stripping apparatus for removal of flavors and odors. High solids may create a feed viscosity that is too high to run on the apparatus.

The apparatus may be selected from a variety of designs known in the art, preferably vertical column designs that permit gravity feed of the slurry or dispersion against an upward flow or countercurrent of steam. The apparatus must be constructed of inert materials that will not contribute off-flavors, odors or colors or other contaminants to the starch. Packing materials for the apparatus may be selected from any of a variety of commercially available proprietary designs. A column apparatus is preferably packed with packing materials that provide high contact surface area and permit high flow rates (e.g., glass beads, stainless steel rings or other stainless steel packing material). The steam-stripping apparatus may be linked to an apparatus for cooking or drying the starch or to an apparatus for carrying out the bleaching step. A source of culinary steam, or a means for removing odors, colors and flavor contaminants from other types of steam, is an essential element of the apparatus used in this process.

If bleaching is carried out after steam-stripping, the bleaching agent must be selected such that it is consumed by the process and no residual reagent remains to create off flavors.

In a preferred mode, bleaching is carried out followed by steam-stripping to remove color, flavor and odor contaminants and their precursors.

In the bleaching process, a slurry or dispersion of starch is brought into contact with selected bleaching agents to remove off-flavors, odors and/or colors. Process conditions are selected to be mild enough to avoid any significant degradation of the starch (i.e., oxidative conversion to a lower molecular weight) but strong enough to improve flavor, odor, and, optionally, color of the starch. The bleaching agents useful herein include chlorite salts, such as sodium chlorite, hypochlorite salts, such as calcium or sodium hypochlorite, peroxides, such as hydrogen peroxide or peracetic acid, persulfate salts, such a sodium, potassium or ammonium persulfate, permanganate salts, such as potassium permanganate, chlorine dioxide, and ozone.

To avoid starch degradation, the starches are treated with a concentration of bleaching agent that is at least at a magnitude of $10^{-1}$ times less than the limits set by the U.S. Food and Drug Administration for chlorine (as sodium hypochlorite) used in degrading starch to produce modified food starch (i.e., a maximum of 5.5% chlorine on a starch dry weight basis is permitted).

Starches are preferably treated with 0.1 to 0.5%, on a dry weight basis, of sodium chlorite at a solution pH of 3.0 to 4.5 and a temperature of 25° to 95° C. for a period of time effective to remove undesirable flavors and odors and crate a product that is lighter in color. Depending on temperature, level of contamination and chlorite concentration, the requisite time may range from about 10 or 15 minutes to 1 to 3 days.

In a preferred embodiment, a dispersion of about 14 to 25% starch hydrolysate is treated with 0.1 to 0.5%, preferably 0.19%, sodium chlorite, on a starch dry weight basis, at a pH of 3.0 to 4.5 and a temperature of less than 100° C., preferably 80° to 5° C., for 1.5 hours. This reaction will consume all active chlorine and bleach the starch to yield a light-colored or a white product, having less intense brown, tan or yellow colors. The same reaction may be carried out at 25° C. for about 12 to 18 hours. The bleaching is carried out in a Teflon® coated vessel or in some other vessel constructed with inert materials in all bleaching agent contact surfaces. Stainless steel and other metals are generally not suitable for use in the bleaching process if a strong oxidant, such as sodium chlorite, is used. Peroxides may be used in stainless steel vessels.

If the food application requires that the starch be used in dried form, the starch may be dehydrated by any method known in the art following preparation of the starch derivative, with or without conversion. Suitable drying methods include spray-drying, drum-drying, flash drying, and the like. In a preferred embodiment the starch derivative is cooked (or pregelatinized) and spray-dried by the method disclosed in U.S. Pat. No. 4,280,851, issued Jul. 28, 1981 to Pitchon et al., or the method disclosed in U.S. Ser. No. 07/471,141, filed Jan. 26, 1990, issued Sep. 22, 1992 as U.S. Pat. No. 5,149,799 to Rubens, which are hereby incorporated by reference.

In a preferred embodiment, the dried, pregelatinized starch derivative is agglomerated to improve dispersibility during food manufacturing.

It is to be understood that this invention includes starch blends containing at least 0.5%, on a starch dry weight basis, of the starch derivative of this invention. In addition, the invention includes blends of the non-gelling starch derivative of this invention together with other components such as gums, celluloses, proteins, fats, other chemically or enzymatically modified starches, and any other lipid mimetic materials or fat replacement ingredients useful in foods. Furthermore, this invention includes multi-step processes in which the starch undergoes modifications in addition to conversion and derivatization.

In foods, the non-gelling starch derivative of this invention may be used in dry form or may be dispersed in water, preferably at starch solids of about 10 to 25% so as to provide an oily-textured aqueous dispersion. The aqueous starch dispersion may be heated prior to use in the foods.

In a preferred embodiment, the non-gelling starches of this invention are added to lipid-containing foods, in lieu of some or all of the lipid content, during manufacturing or processing of the foods. The non-gelling starches are preferred when used in processed foods such as spoonable and pourable salad dressings, margarines and butter substitutes, low-fat spreads, low-fat cheeses, baked goods, puddings, sauces, gravies, imitation mayonnaise, soups, frozen desserts, dairy products, imitation peanut butter and peanut spreads, and frostings and icings. Any liquid, flowable or spoonable food is a suitable matrix for inclusion of the non-gelling starch derivative as a lipid mimetic. The food may also be in a solid form when consumed (e.g., baked goods are prepared in liquid or flowable forms and consumed in dry, solid forms).

In a preferred embodiment, a lipid-containing food is formulated with a non-gelling starch derivative in lieu of lipid, so as to provide from 0.01 to 100% replacement, most preferably 25 to 100% replacement of the lipid that is traditionally contained in that food.

The following examples will more fully illustrate the embodiments of this invention. In these examples, all parts and percentages are given by dry weight basis, and all temperatures are in degrees Celsius unless otherwise noted.

TESTING PROCEDURES

WATER FLUIDITY MEASUREMENT

The water fluidity of the starches is measured using a Thomas Rotational Shear-Type Viscometer (manufactured by Arthur H. Thomas Co., Philadelphia, Pa. 19106), standardized at 30° C. with a standard oil having a viscosity of 24.73 cps, which oil requires 23.12±0.05 sec for 100 revolutions. Accurate and reproducible measurements of water fluidity are obtained by determining the time which elapses for 100 revolutions at different solids levels depending on the starch's degree of conversion (as conversion increases, the viscosity decreases). The procedure used involves slurrying the required amount of starch (e.g., 6.16 g, dry basis) in 100 ml of distilled water in a covered copper cup and heating the slurry in a boiling water bath for 30 minutes with occasional stirring. The starch dispersion is then brought to the final weight (e.g., 107 g) with distilled water. The time required for 100 revolutions of the resultant dispersion at 81°–83° C. is recorded and converted to a water fluidity number using a conversion table.

| Time Required for 100 Revolutions (seconds) Amount of Starch used (anhydrous, g): | | | | |
|---|---|---|---|---|
| 6.16[a] | 8.80[b] | 11.44[c] | 13.20[d] | Water Fluidity |
| 60.0 | | | | 5 |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |
| | | | 13.5 | 75 |
| | | | 11.5 | 80 |
| | | | 10.0 | 85 |
| | | | 9.0 | 90 |

For [a], [b], [c], and [d], final weights of starch solutions are 107, 110, 113, and 115 g, respectively.

FUNNEL VISCOSITY MEASUREMENTS

To measure funnel viscosity at 19% solids, 38 g of the starch (anhydrous basis) was weighed into a tared 250 ml beaker (stainless steel) containing a thermometer and brought to 200 g total weight with distilled water. The samples was mixed to dissolve any lumps and heated or cooled to 72° F. (22° C.). A total of ml of the cooked starch dispersion was measured into a graduated cylinder. It was then poured into a calibrated funnel while using a finger to close the orifice. A small amount was allowed to flow into the graduate to remove any trapped air, and the complete balance remaining in the graduate was poured back into the funnel. Using a timer, the time required for the 100 ml sample to flow through the apex of the funnel was recorded.

The funnel was a standard 58°, thick-wall, resistance glass funnel whose top diameter was about 9–10 cm with the inside diameter of the stem being about 0.381 cm. The funnel was calibrated so as to allow 100 ml of water to go through in 6 seconds using the above procedure.

STABILITY TEST

This test is used to distinguish stable starches from gelling starches. Cooked starch dispersions of gelling starches containing from 10–50% solids should be capable of forming a gel after standing for 24 hr. at 4° C. Stable starches will not gel. The starches are cooked by heating an aqueous slurry containing the starch to 95°–100° C. and maintaining it for 15 minutes before cooling.

EXAMPLE 1

This example illustrates the preparation of the modified starch of this invention. Unless otherwise indicated, the starch was hydrolyzed prior to derivatization with a reagent.

Acid Hydrolysis

Aqueous slurries of 35 to 45% corn starch were treated, on a starch dry weight basis, with sufficient (i.e., 0.6%, 1.5%, or 3.5%) sulfuric acid to convert the corn starch samples to a WF of about 35, 60 or 78. The acid conversion was carried out at 52° C. for 16.5 hours.

Corn starch samples that had been treated with at least 5% propylene oxide prior to hydrolysis were acid-converted by treating the hydroxypropylated starch derivative with 1.5% or 3.5%, on a starch dry weight basis,, sulfuric acid at 40° C. for 20 hours to yield a WF of about 45 or 62, respectively.

Waxy maize starch was acid-converted in the same manner as corn starch, except 1.5%, 3.5% or 10% sulfuric acid was used to produce starch with a WF of about 60, 79 or 87, respectively.

Enzyme Hydrolysis

Aqueous starch dispersions containing about 23 to 33% solids were prepared from hydroxypropylated waxy maize, corn, tapioca, potato and high amylose corn starches and held in a hot water bath at 80°–85° C. Approximately 0.03%, on a starch dry weight basis, of alpha amylase (Thermamyl® enzyme obtained from Novo Laboratories, Denmark) was added to the starch dispersion and enzymatic hydrolysis was permitted to run for periods of time ranging from 30 to 1,260 minutes. The hydrolyzed starch products were characterized by a funnel viscosity from about 14.7 to 382 seconds and a reducing sugar content of about 0.80 to 7.70%.

Oxidative Hydrolysis

Approximately 50 to 70 ppm potassium permanganate was added to waxy maize starch which then was treated with from 0.05 to 0.22%, on a starch dry weight basis, of a 30% solution of hydrogen peroxide. The oxidative hydrolysis was carried out in the presence of 0.6% NaOH at room temperature for 2 hours.

Waxy maize starch samples that had been treated with 10% propylene oxide were subjected to oxidative hydrolysis as described above, except that the hydrolysis (using from 0.20 to 0.80% of a 30% $H_2O_2$ solution) required 8 hours to complete at room temperature. The end point was measured by a negative reaction to potassium iodide. The oxidatively hydrolyzed hydroxypropylated waxy maize starches had a WF of about 9.0 to 40.5.

Propylene Oxide Derivatization

Aqueous starch slurries were reacted with various amounts of propylene oxide reagent, ranging from 0.5 to 20% propylene oxide on a starch dry weight basis, at 40° C. in the presence of 25% $Na_2SO_4$ and 1.5% NaOH, on a starch dry weight basis, to form hydroxypropyl starch ether derivatives. Derivatives were prepared from waxy maize, corn, hydrolyzed waxy maize, hydrolyzed corn, tapioca, potato and high amylose starches. Hydroxypropyl substitution levels were determined by NMR analysis. Depending upon the amount of reagent used for the reaction, the starch derivatives had percent substitution levels ranging from 0.4 to 20.8%, (about 0.01 to 0.73 d.s.) on a starch dry weight basis.

Acetate Derivatization

Aqueous starch slurries were reacted on a starch dry weight basis, with from 5 to 20% acetic anhydride at room temperature and a pH of 7.8 to 8.0 (controlled by the addition of 3% NaOH). The acetate starch derivatives produced by this reaction had a degree of substitution of 0.07 to 0.25.

EXAMPLE 2

This example illustrates the properties of the modified starches of this invention.

Part A

The converted hydroxypropyl ether waxy maize starch derivatives described in Table I, below, were prepared by the methods of Example 1, dispersed in water, cooked, and evaluated for appearance and texture. All samples were converted prior to derivatization. Results are described in Table I.

Samples of the starches were also tested in the French salad dressing formulation set forth in Part B, below. Results are shown in Table I.

TABLE I

Properties of Converted Hydroxypropyl Ether Waxy Maize Starch Derivatives

| Starch[a] Sample | WF | Propylene Oxide[b] | | | | Evaluation | |
|---|---|---|---|---|---|---|---|
| | | Conversion | % Treatment | % Substitution/d.s. | % Solids | Aqueous Cook[c] | Salad Dressing[d] |
| WM-1 | 38 | Oxidation | 2 | 1.8/0.05 | 15 | stable, sl. cloudy, oily | — |
| WM-2 | 38 | Oxidation | 4 | 3.3/0.10 | 15 | stable, sl. cloudy, oily | — |
| WM-3 | 38 | Oxidation | 6 | 4.6/0.13 | 15 | stable, sl. cloudy, oily | — |
| WM-4 | 38 | Oxidation | 8 | 6.8/0.20 | 15 | stable, sl. cloudy, oily | — |
| WM-5 | 38 | Oxidation | 10 | 8.0/0.24 | 15 | stable, sl. cloudy, oily | — |
| WM-6 | 35 | Oxidation | 8.0 | 4.9, 4.3/0.13 | 15 | — | Less oily mouthfeel |
| WM-7 | 35 | Oxidation | 9.0 | 6.2, 6.1/0.18 | 15 | — | Good |
| WM-8 | 35 | Oxidation | 10.0 | 5.9, 5.8/0.17 | 15 | — | Good |
| WM-9 | 35 | Oxidation | 11.5 | 7.2, 7.2/0.22 | 15 | — | Good |

| Starch[a] Sample | WF | % $H_2SO_4$ | % Treatment | % Substitution/d.s. | % Solids | Aqueous Cook[c] | Salad Dressing[d] |
|---|---|---|---|---|---|---|---|
| WM-10 | 60 | 1.5 | 0.5 | 0.4/0.01 | 30 | pasty gel | |
| WM-11 | 60 | 1.5 | 1.0 | 0.8/0.02 | 30 | pasty gel | |
| WM-12 | 59 | 1.5 | 2.5 | 1.3/0.04 | 25/30 | soft gel/firm gel | |
| WM-13 | 59 | 1.5 | 5.0 | 4.1/0.12 | 25/30 | stable, sl. cloudy/heavier sticky | |
| WM-14 | 57 | 1.5 | 10.0 | 8.4/0.26 | 25/30 | stable, stinky, sl. cohesive/heavier | |
| WM-15 | 79 | 3.5 | 0.5 | 0.4/0.01 | 30 | pasty gel | |
| WM-16 | 79 | 3.5 | 1.0 | 0.8/0.02 | 30 | pasty gel | |
| WM-17 | 79 | 3.5 | 2.5 | 2.0/0.06 | 30 | stirrable gel, opaque, salve-like | |
| WM-18 | 79 | 3.5 | 5.0 | 3.8/0.11 | 30 | stirrable gel, opaque, salve-like | |
| WM-19 | 78 | 3.5 | 10.0 | 8.3/0.25 | 30 | stable, clear, thin, close to soy bean oil | |
| WM-20 | 88 | 10.0 | 0.5 | 0.4/0.01 | 30 | pasty gel | |
| WM-21 | 87 | 10.0 | 1.0 | 0.8/0.02 | 30 | pasty gel | |
| WM-22 | 86 | 10.0 | 2.5 | 2.1/0.06 | 30 | heavy set, thick, opaque | |
| WM-23 | 86 | 10.0 | 5.0 | 4.0/0.12 | 30 | salve-like set, opaque | |
| WM-24 | 86 | 10.0 | 10.0 | 8.2/0.25 | 30 | stable, opaque | |

[a]Starch base samples WM-1 to WM-9 was a waxy maize starch that had been converted by the oxidative hydrolysis method of Example 1 to a WF of 38 (samples WM-1–WM-5) or 35 (samples WM-6–WM-9). On a starch weight basis, 50 ppm of $KMnO_4$ and 0.20% of a 30% $H_2O_2$ solution were used in the conversion.
[b]Reaction of starch with propylene oxide was carried out by the method of Example 1.
[c]A 15% starch solids aqueous dispersion (sample WM-1–WM-5) was heated to 95° C. for 20 minutes and cooled. Samples were evaluated for gelling characteristics about 24 hours after dispersions were prepared. For samples WF-10 to WF-24, the percent starch solids was varied as shown above.
[d]See Part B, below for a description of the French salad dressing formulation.
[e]Starch base for samples WM-10 to WM-24 was a waxy maize starch that had been converted by the sulfuric acid treatment method of Example 1.
[f]Water fluidity measurements were made as described above under "Test Procedures". As the WF increases, the viscosity of the starch dispersion decreases.

The results show that as the percent propylene oxide treatment increased, the starch dispersions exhibited heavier body, and were characterized by an increasingly apparent oily texture. All of the starch cooks prepared from starch having a d.s. of greater than 0.06 were stable and did not form a gel upon cooling.

Part B

Starches were evaluated in the French salad dressing formulation shown below.

TABLE II

French Salad Dressing Formulation

| Ingredient | Percent by Weight | |
|---|---|---|
| | Control | Experimental |
| Vegetable oil | 38.2 | — |
| Water | 20.85 | 48.14 |
| Sugar | 11.52 | 11.51 |
| Tomato paste (25% solids) | 6.0 | 6.5 |
| Salt | 1.0 | 1.0 |
| Mustard powder | 1.0 | 0.3 |
| Onion powder | 0.5 | 0.3 |
| Garlic powder | 0.2 | 0.2 |
| Keltrol F[a] gum | 0.25 | 0.35 |
| Kelold LVF[b] gum | — | 0.3 |
| MSG | 0.3 | 0.5 |
| Oleoresin Paprika | 0.05 | 0.12 |
| Sodium Benzoate | 0.08 | 0.08 |
| Pregelatinized corn starch[c] | — | 2.5 |
| 50 Grain white vinegar | 20.0 | 24.0 |
| $TiO_2$ | — | 0.15 |
| Potassium sorbate | 0.08 | 0.08 |
| Starch (WM-6–WM-9)[d] | — | 4.08 |
| | 100.00 | 100.00 |

[a]A xanthan gum obtained from Kelco Division of Merck, San Diego, California.
[b]A gum, obtained from Kelco Division of Merck, San Diego, California.
[c]ULTRA-TEX® 4 starch obtained from National Starch and Chemical Company, Bridgewater, New Jersey.
[d]See Table I, above, for a description of experimental starches.

The French salad dressing samples were prepared by blending the dry ingredients, adding the blend to water in a Hobart Mixer and mixing the aqueous dispersion for 10 minutes at #2 speed. The tomato paste and oleoresin paprika were blended, added to the aqueous dispersion and mixed for 2 minutes at #2 speed. The oil was slowly added at #2 speed, followed by the vinegar. The mixture was mixed for one minute at #3 speed and then put through a Charlotte colloid mill, set at a clearance of 0.03 inches.

The viscosity of all salad dressing samples was similar. The full fat control dressing was slightly lower in viscosity than the experimental samples before and after milling and after storage. Texture and mouthfeel were evaluated by an experienced taste panel after 3 days of storage under refrigeration. Results are shown in Table I, above.

The viscosity of the dressings was measured before and after colloid mill treatment and after storage for 3 days under refrigeration. Variations in propylene oxide treatment levels did not cause variations in viscosity.

In salad dressing, a propylene oxide degree of substitution of at least about 0.12 on a converted waxy maize starch gave a highly desirable oily mouthfeel and a smooth, creamy texture similar to the full fat control.

Thus, the modified starches of this invention are non-gelling, stable starches having an oily texture in aqueous dispersion and utility in foods as a fat replacer.

EXAMPLE 3

This example illustrates that the modified starches of this invention may be prepared from non-hydrolyzed starch derivatives as well as from hydrolyzed (converted) starch derivatives.

Part A

The corn, waxy maize, potato and tapioca (non-converted) starches described in Table III, below, were modified by the methods of Example 1 and evaluated in aqueous dispersions. Results are shown in Table III.

TABLE III

Properties of Non-Converted Hydroxypropyl Ether Starch Derivatives

| Starch[a] Sample | Propylene Oxide | | Evaluation | |
|---|---|---|---|---|
| | % Treatment | % Substitution/d.s. | Aqueous Cook[b] | Salad Dressing[c] |
| T-1 | 10 | 7.1, 7.2/0.22 | stable, sl. cloudy, cohesive | good oiliness |
| P-1 | 10 | 8.4, 8.4/0.26 | stable, sl. cloudy, cohesive | acceptable oiliness |
| WM-25 | 10 | 8.1, 7.9/0.24 | stable, sl. cloudy, cohesive | very good oiliness |
| WM-26 | 20 | 14.3, 14.2/0.47 | stable, sl. cloudy, cohesive | very good oiliness |
| C-1 | 10 | 7.2, 7.2/0.22 | stable, sl. cloudy, cohesive | acceptable oiliness |
| C-2 | 20 | 13.8, 13.7/0.45 | stable, sl. cloudy, cohesive | good oiliness |

[a]Samples (T-1 = tapioca; P-1 = potato; WM-25 & 26 = waxy maize; and C-1 & 2 corn starch) were reacted with propylene oxide by the method of Example 1.
[b]Aqueous dispersions containing 5% solids, on a starch dry weight basis, were prepared by cooking the dispersion at 95° C. for 30 minutes and cooling the dispersion.
[c]See Part B, below, for salad dressing formulation. Evaluations were done by comparing experimental samples to an oil-containing control.

The results of the evaluation showed that aqueous dispersions containing the non-converted starch derivatives were non-gelling and formed stable, aqueous dispersions having a cohesive character. Thus, non-converted (non-hydrolyzed) starches are useful in this invention.

Part B

Where indicated in Table III, above, the starches of this invention were used to formulate a spoonable salad dressing (a mayonnaise-type salad dressing) according to the formulation shown in Table IV, below.

TABLE IV

Spoonable Salad Dressing Formulation

| Ingredient | Percent by Weight | |
|---|---|---|
| | Control | Experimental |
| Purity ® 420 Starch[a] | 3.4 | — |
| Thermflo ® Starch[a] | — | 6.0 |
| Experimental Starch[b] | — | 3.0 |
| Water | 20.15 | 63.95 |
| White Vinegar | 17.21 | 14 |
| Cane Sugar | 7.2 | 5 |
| Salt | 1.3 | 1.3 |
| Mustard Powder | 0.500 | 0.5 |
| Sodium Benzoate | 0.079 | 0.079 |
| Potassium Benzoate | 0.079 | 0.079 |
| Citric Acid | 0.091 | 0.091 |
| $Ca_2Na_2$ EDTA[c] | 0.0075 | 0.0075 |
| Egg Yolks[d] | 5 | 3 |
| Vegetable Oil | 45 | 3 |

[a]Starches were obtained from National Starch and Chemical Company, Bridgewater, New Jersey.
[b]Experimental starches are described in Table III, above as Samples T-1, P-1 and WM-25.
[c]Calcium sodium ethylenediamine tetracetic acid.
[d]Frozen egg yolks were used.

Salad dressing samples were prepared by dry blending all dry ingredients, adding them to the water and vinegar and heating the mixture to 190° F. (88° C.) for minutes. After the mixture had been heated, the formulation was corrected for lost water and permitted to cool in a covered container overnight. Egg yolk was added to the mixture in a Hobart mixer at #1 speed for 3 minutes. Vegetable oil was slowly added at #2 speed to form an emulsion followed by mixing at #3 speed for 1 minute. Samples were processed with a Charlotte colloid mill (set at 0.050 inch clearance) and stored at 45° F. (7° C.) prior to evaluation by a trained taste panel.

In preparing the dressings, samples were adjusted to a constant viscosity of 25,000–50,000 cps (using a D-spindle at 10 rpms on a HAT Brookfield viscometer at room temperature) to avoid variations in mouthfeel that might be caused by viscosity differences between samples. A degree of substitution of greater than 0.2 hydroxypropyl ether substituent on a non-converted starch provided a desirable oily mouthfeel in spoonable salad dressing.

EXAMPLE 4

This example illustrates that the converted starch derivatives of this invention may be prepared by first converting the starch and then preparing the derivative as in Example 2 or by reversing the process. In addition, the conversion may be carried out by acid, enzyme or oxidative hydrolysis. The starches described in Table V and VI, below were prepared by the methods of Example 1 (derivatizing first, then converting) and evaluated in aqueous dispersions. Results are shown in Table V and VI.

TABLE V

Properties of Hydroxypropyl Ether Acid-Converted Starch Derivatives

| Starch[a] Sample | % $H_2SO_4$ | Propylene Oxide | | Evaluation | |
|---|---|---|---|---|---|
| | | % Treatment | % Substitution/d.s. | WF | Aqueous[b] Cook - % solids |
| WM-27 | 1.5 | 0.5 | 0.4/0.01 | 74 | Pasty Gel - 30 |
| WM-28 | 3.5 | 0.5 | 0.4/0.01 | 81 | Pasty Gel - 30 |
| WM-29 | 1.5 | 1.0 | 0.8/0.02 | 75 | Stable Salve-like - 30 |
| WM-30 | 3.5 | 1.0 | 0.8/0.02 | 82 | Stable Salve-like - 30 |
| WM-31 | 1.5 | 5.0 | 4.1/0.12 | 68 | Stable Salve-Like/Heavy Set - 25/30 |
| WK-32 | 3.5 | 5.0 | 4.1/0.12 | 79 | Opaque, Salve-like - 30 |

[a]Samples (waxy maize starch: WM-27 to WM-32) were first reacted with propylene oxide and then acid-converted by the methods of Example 1.
[b]Aqueous dispersions containing the indicated percent starch solids were prepared by the method of Example 2.

TABLE VI

Properties of Hydroxypropyl Ether, Oxidatively Converted Starch Derivatives

| Starch Sample[a] | % H$_2$O$_2$ | Propylene Oxide % Treatment | % Substitution/d.s. | WF | Evaluation[b] Salad Dressing |
|---|---|---|---|---|---|
| WM-33 | 0.40 | 10 | 6.6, 6.7/0.20 | 33.8, 34.0, 33.0 | Acceptable in spoonable salad dressing |
| WM-34 | 0.45 | 10 | 6.5, 6.4/0.19 | 33.5, 33.0 | Acceptable in spoonable salad dressing |
| WM-35 | 0.50 | 10 | 6.5, 6.3/0.19 | 33.8 | Acceptable in spoonable salad dressing |
| WM-36 | 0.55 | 10 | 6.8. 6.7/0.20 | 35.0, 35.0, 34.9 | Acceptable in spoonable salad dressing |
| WM-37 | 0.60 | 10 | 6.5, 6.4/0.19 | 31.9 | Acceptable in spoonable salad dressing |
| WM-38 | 0.70 | 10 | 6.8. 6.6/0.20 | 31.7 | Acceptable in spoonable salad dressing |
| WM-39 | 0.80 | 10 | 5.9, 5.9/0.17 | 32.5 | Acceptable in spoonable salad dressing |

[a]Samples (waxy maize starch: WM-33 to WM-39) were first reacted with propylene oxide and then converted with hydrogen peroxide and potassium permaganate by the method of Example 1.
[b]Samples were evaluated in the spoonable salad dressing of Example 3, Part B.

The results show that for the purposes of this invention the order of the starch reaction steps is not critical. Conversion does not have a negative effect on hydroxypropyl ether substitution levels.

EXAMPLE 6

This example illustrates that a variety of starch derivatives may be employed in this invention.

The starches described in Table VII, below, were prepared by the methods of Example 1 and tested for functional properties with the results shown in Table VII.

TABLE VII

Properties of Various Modified Starches

| Starch[a] Sample | Conversion[b] Type (Acid) | Conversion[b] Degree (WF) | Derivative[c] % Treatment | Derivative[c] % Substitution/d.s. | Evaluation[d] Aqueous Cook |
|---|---|---|---|---|---|
| | | | (Acetate) | | |
| WM-40 | H$_2$SO$_4$ | 38 | 5.0 | 1.9/0.07 | Stable, sl. cloudy, cohesive |
| WM-41 | H$_2$SO$_4$ | 38 | 10.0 | 3.4/0.13 | Stable, sl. cloudy, cohesive |
| WM-42 | H$_2$SO$_4$ | 38 | 15.0 | 4.2/0.16 | More cohesive |
| WM-43 | H$_2$SO$_4$ | 38 | 20.0 | 6.2/0.25 | More cohesive |
| | | | (Propylene Oxide) | | |
| WM-44 | H$_2$SO$_4$ (Enzyme) | 38 (Funnel Viscosity) | 10.0 (% R.S.[f]) | 7.7/.23 | — |
| HA-1[e] | 52 mins. | 71.2 sec (23.1% solids) | 2.19 | 20.0 | 15.5/0.51 | Sl. cloudy |
| WM-45 | 75 mins. | 34 sec (27.7% solids) | 2.16 | 10.0 | 8.6/0.26 | Sl. cloudy |
| T-2 | 270 mins. | 15.6 sec (25% solids) | 4.00 | 15.0 | 11.0/0.34 | Sl. cloudy |
| T-3 | 115 mins. | 67.1 sec (25% solids) | 2.03 | 20.0 | 15.0/0.49 | Very sl. cloudy |
| T-4 | 180 mins. | 47.3 sec (25% solids) | 4.06 | 20.0 | 15.0/0.49 | Very sl. cloudy |
| P-2 | 40 mins. | 122.5 sec (28.3% solids) | 0.80 | 10.0 | 8.6/0.26 | Clear |

[a]Samples (waxy maize starch: WM-40 to WM-45; high amylose corn starch: HA-1; tapioca starch: T-2 to T-4 and potato starch P-2) were reacted with the indicated reagents and converted by the methods of Example 1.
[b]As indicated, starch was either acid-converted or converted with an alpha-amylase enzyme by the methods of Example 1.
[c]Starch derivatives were prepared by the methods of Example 1 by reaction with either acetic anhydride or propylene oxide.

TABLE VII-continued

Properties of Various Modified Starches

| Starch[a] Sample | Conversioin[b] | Derivative[c] % Treatment | % Substitution/d.s. | Evaluation[d] Aqueous Cook |
|---|---|---|---|---|

[d]Aqueous dispersions containing the indicated percent starch solids were prepared by the method of Example 2.
[e]High amylose corn starch (containing about 70% amylose) was obtained from National Starch and Chemical Company.
[f]Percent reducing sugar of starch was measured by the Fehling method.

The results show that a suitable, stable (non-gelling) starch acetate may be prepared and used in place of the propylene oxide derivatives of this invention. Likewise, a variety of root and cereal starches, and enzymatic, as well as acid- and oxidative conversion processes may be used to modify the starches of this invention.

EXAMPLE 7

This example illustrates the use of the various modified starches of this invention as fat-replacers or lipid mimetics in a low-fat spoonable salad dressing.

The starches identified in Table VIII, below, and described in detail in Examples 1–6, herein, were added to the spoonable salad dressing formulation shown in Table IV of Example 3, Part B. The salad dressing samples were evaluated for viscosity, storage stability and organoleptic properties. Results are shown in Table VIII.

TABLE VIII

Evaluation of Modified Starches in Spoonable Salad Dressing

| | Starch[a] | | Viscosity[b] (cps) | | | Organoleptic Evaluation[c] | | |
|---|---|---|---|---|---|---|---|---|
| | Modification[d] | | | Week | | | | |
| Sample | Conversion | Derivative | Initial | One | Three | Body | Oil | Melt |
| Full Fat Control | — | — | 40,000 | 62,000 | 38,000 | 5.0 | 5.0 | 5.0 |
| P-3 | Enzyme | 10% P.O. | 32,000 | 42,000 | 36,000 | 5.1 | 3.5 | 5.0 |
| WM-43 | Acid | 20% A. | 40,000 | 48,000 | 42,000 | 5.3 | 2,5 | 3.6 |
| T-2 | Enzyme | 15% P.O. | 28,000 | 38,000 | 34,000 | 4.9 | 3.9 | 4.8 |
| HA-1 | Enzyme | 20% P.O. | 24,000 | 30,000 | 28,000 | 4.5 | 4.0 | 4.3 |
| W-25 | None | 10% P.O. | 40,000 | 48,000 | 44,000 | 4.6 | 4.3 | 4.8 |
| C-2 | None | 20% P.O. | 34,000 | 42,000 | 36,000 | 4.9 | 3.8 | 4.5 |
| WM-41 | Acid | 10% A. | 38,000 | 44,000 | 34,000 | 4.6 | 4.1 | 4.1 |
| WM-1 | Oxidation | 2% P.O. | 36,000 | 44,000 | 40,000 | 4.4 | 3.6 | 5.1 |
| WM-2 | Oxidation | 4% P.O. | 34,000 | 40,000 | 38,000 | 5.3 | 4.0 | 5.1 |
| WM-3 | Oxidation | 6% P.O. | 36,000 | 38,000 | 40,000 | 4.6 | 4.3 | 4.9 |
| WM-4 | Oxidation | 8% P.O. | 40,000 | 42,000 | 40,000 | 5.0 | 4.4 | 4.7 |
| WM-5 | Oxidation | 10% P.O. | 42,000 | 40,000 | 40,000 | 4.8 | 4.3 | 4.3 |
| P-4 | Enzyme | 10% P.O. | 28,000 | 32,000 | 32,000 | 4.7 | 4.5 | 4.4 |
| W-45 | Enzyme | 10% P.O. | 32,000 | 36,000 | 34,000 | 4.5 | 4.2 | 4.8 |
| C-1 | None | 10% P.O. | 40,000 | 60.000 | 52.000 | 5.3 | 4.4 | 4.4 |
| T-4 | Enzyme | 20% P.O. | 28,000 | 32,000 | 28,000 | 4.9 | 3.8 | 4.7 |
| T-3 | Enzyme | 20% P.O. | 26,000 | 30.000 | 30,000 | 4.7 | 4.7 | 5.4 |
| T-1 | None | 10% P.O. | 48,000 | 46,000 | 46,000 | 4.8 | 4.1 | 3.8 |
| WM-44 | Acid | 10% P.O. | 44,000 | 42,000 | 40,000 | 5.6 | 4.5 | 4.9 |
| P-1 | None | 10% P.O. | 36,000 | 36,000 | 32,000 | 4.7 | 4.0 | 4.2 |
| WM-26 | None | 20% P.O. | 36,000 | 38,000 | 36,000 | 4.5 | 4.5 | 5.2 |
| WM-42 | Acid | 15% A. | 40,000 | 40,000 | 40,000 | 4.5 | 4.3 | 4.3 |
| WM-40 | Acid | 5% A. | 38,000 | 38,000 | 36,000 | 4.0 | 3.5 | 4.5 |

[a]Samples and modification are described in Examples 1–6, and Table I, III, V, and VII.
[b]The viscoisty was measured in centipoise (cps) at room temperature using a Brookfield Viscometer (HAT) at 10 rpms, equipped with a D-spindle. Measurements were made initially and after one and three weeks of refrigerated storage.
[c]Organoleptic evaluations were done by a trained taste panel comprising 4–6 persons. Samples were rated on a scale of 1–10 for body, oiliness and melt rate against the full fat control described in Example 3, Part B. Optimum oiliness, body and melt rate were 5.0. Heavy or thin bodied dressings were less desirable than the full fat control. Too rapid or too slow melt rates were less desirable than the full fat control. An oiliness rating of at least 3.5 represented an acceptable, oily or fatty mouthfeel.
[d]Modifications included the indicated starch derivatives obtained from acetic anhydride ("A") or propylene oxide ("P.O.") treatments.

The results showed that all converted, propylene oxide treated waxy maize starches (that were treated with at least 4% propylene oxide) provided excellent oiliness in spoonable salad dressings.

EXAMPLE 8

This example illustrates that the modified starches of this invention are useful as fat-replacers or mimetics in a variety of foods.

Part A

The low-fat muffin formulation shown below was prepared using a hydroxypropyl ether derivative of converted waxy maize starch and compared to the full-fat control formulation shown below.

| Muffin Formulation | | |
|---|---|---|
| | Percent By Weight | |
| Ingredients | Control | Experimental |
| Water | 28.37 | 34.76 |
| Cake flour | 20.72 | 21.12 |
| Bakers special sugar | 9.91 | 20.30 |
| Brown sugar | 6.76 | 6.89 |
| Oat bran | 5.72 | 5.83 |
| Nonfat dry milk | 2.51 | 2.56 |
| Shortening | 10.50 | — |
| Starch[a] | — | 2.92 |
| Baking powder | 1.84 | 1.87 |
| Dried egg whites | 1.37 | 1.40 |
| Mono- and di-glycerides | 0.68 | 0.70 |
| Salt | 0.58 | 0.59 |
| Vanilla | 0.56 | 0.57 |
| Sodium stearoyl lactylate | 0.35 | 0.35 |
| Cinnamon | 0.13 | 0.13 |
| Allspice | 0.02 | 0.02 |
| | 100 | 100 |

[a]Experimental starch was a steam-atomized/spray-dried, agglomerated, oxidatively-converted, 35 WF, hydroxypropyl ether, waxy maize starch derivative, having a d.s. of about 0.17.

Muffins were prepared by creaming the mono- and di-glycerides, brown sugar, sodium stearoyl lactylate and salt on medium speed in a Hobart Mixer. The egg was added slowly and mixed for several minutes on medium speed before adding the milk and water. The dry ingredients were blended and added to the liquid ingredients at low speed. Muffin cups were filled with 60 g of the batter and muffins were baked at 205° C. (400° F.) for 15–20 minutes.

The baked muffins were evaluated for flavor, texture and appearance. Control and experimental muffins each rose ½ inch higher than the muffin cup during baking and had a moist texture. Thus, the starches of this invention provided an acceptable low-fat muffin.

Part B

The low-fat cheese sauce mix formulation shown below was prepared using a converted hydroxypropyl waxy maize starch and compared to the full fat control formulation shown below.

| Cheese Sauce Mix Formulation | | | |
|---|---|---|---|
| | Percent by Weight | | |
| Ingredients | Control-Fat | Experimental | Control-No Starch |
| Cheese Powder Blend | 33.8 | 33.8 | 33.8 |
| Sweet Whey | 14.7 | 15.0 | 15.0 |
| Salt | 3.0 | 3.0 | 3.0 |
| Lactic Acid 22% | 0.6 | 0.6 | 0.6 |
| Nonfat Dry Milk | 6.0 | 6.0 | 6.0 |
| Flavor Enhancer | 2.7 | 2.7 | 2.7 |
| Shortening Powder | 16.0 | — | — |
| ULTRA-TEX ® 3 Starch | 23.2 | 24.8 | 24.8 |
| Starch[a] | — | 9.3 | — |
| Cultured Whey[b] | — | 1.5 | 1.5 |
| 24 DE Maltodextrin | — | 3.3 | 12.6 |

[a]Experimental starch was a jet-cooked/spray-dried, acid-converted, 34 WF, hydroxypropyl ether, waxy maize starch derivative, having a d.s. of 0.24.
[b]Obtained from Quest International Flavors & Food Ingredients Company, Sarasota, Florida.

To prepare a cheese sauce, the ingredients were dry-blended, 58.2 of the dry blend was added to one cup of water, blended with a wire whip, and cooked in a microwave oven to a temperature of 72° C. (160° F.). A panel of trained tasters evaluated the controls and the experimental sauces for flavor and texture and found the experimental sauce acceptable, although the full-fat control was preferred by most tasters for body and mouth-coating effect. Thus, the starches of this invention provided an acceptable low-fat cheese sauce.

Now that the preferred embodiments have been described in detail, various modifications and improvement thereon will become readily apparent to those skilled in the art. Accordingly, the spirit and scope of the invention are to be limited only by the appended claims and not by the foregoing specification.

We claim:

1. A method for preparing a food having a reduced lipid content, which comprises the step of replacing at least a portion of the lipid in the food with an aqueous dispersion consisting essentially of water and an effective amount of a non-gelling, pregelatinized starch derivative or a cooked aqueous dispersion consisting essentially of water and an effective amount of a non-gelling, granular starch derivative, said starch derivative having a degree of substitution sufficient to render the starch non-gelling and liquid or flowable when dispersed at 1–50% solids in water at 0°–100° C. and sufficient to impart an oily mouthfeel to the food containing the starch.

2. The method of claim 1, wherein the non-gelling starch derivative has a degree of substitution of at least 0.10 and is prepared by derivatizing the starch and then converting the starch derivative or by converting the starch and then derivatizing the converted starch.

3. The method of claim 2, wherein the non-gelling converted and derivatized starch or derivatized and converted starch is prepared from a starch selected from the group consisting of corn, tapioca, potato, rice, wheat, sweet potato, quinoa, sago, sorghum, pea, waxy maize, waxy rice, and a starch having an amylose content above 40%.

4. The method of claim 3, wherein the starch is the waxy maize starch or the tapioca starch and wherein the non-gelling converted and derivatized starch or derivatized and converted starch is prepared from an enzyme-converted starch having a dextrose equivalent of less than 5.

5. The method of claim 3, wherein the starch is the waxy maize starch or the tapioca starch and wherein the non-gelling converted and derivatized starch or derivatized and converted starch is prepared from an acid-converted or oxidatively-converted starch having a water fluidity of about 20–80.

6. The method of claim 5, wherein the converted starch has a water fluidity of about 30–65.

7. The method of claim 1, wherein the starch derivative is a hydroxypropyl waxy maize starch ether or a hydroxypropyl tapioca starch ether having a degree of substitution of about 0.1.2 to 0.93.

8. The method of claim 1, wherein the starch derivative is a waxy maize acetyl starch ester or tapioca acetyl starch ester having a degree of substitution of about 0.07 to 0.25.

9. The method of claim 1, wherein the non-gelling starch derivative is prepared by reacting an acid-converted waxy maize starch having a water fluidity of about 30–65 with sufficient propylene oxide to give a hydroxypropyl oxidatively-converted starch ether having a degree of substitution of about 0.12 to 0.93.

10. A method for preparing an aqueous-containing food having a reduced lipid content, which comprises the step of replacing at least a portion of the lipid in the food by dispersing in the aqueous-containing food an effective amount of a non-gelling, granular or pregelatinized starch derivative having a degree of substitution sufficient to render the starch non-gelling and liquid or flowable when dispersed at 1–50% solids in water at 0°–100° C. and sufficient to impart an oily mouthfeel to the aqueous-containing food containing the dispersed starch.

11. The method of claim 10, wherein the non-gelling starch derivative has a degree of substitution of at least 0.10 and is prepared by derivatizing the starch and then converting the starch derivative or by converting the starch and then derivatizing the converted starch.

12. The method of claim 11, wherein the non-gelling converted and derivatized starch or derivatized and converted starch is prepared from a starch selected from the group consisting of corn, tapioca, potato, rice, wheat, sweet potato, quinoa, sago, sorghum, pea, waxy maize, waxy rice, and a starch having an amylose content above 40%.

13. The method of claim 12, wherein the starch is the waxy maize starch or the tapioca starch and wherein the non-gelling converted and derivatized starch or derivatized and converted starch is prepared from an enzyme-converted starch having a dextrose equivalent of less than 5.

14. The method of claim 12, wherein the starch is the waxy maize or the tapioca starch and wherein the non-gelling converted and derivatized starch or derivatized and converted starch is prepared from an acid-converted or oxidatively-converted starch having a water fluidity of about 20–80.

15. The method of claim 14, wherein the converted starch has a water fluidity of about 30–65.

16. The method of claim 10, wherein the starch derivative is a hydroxypropyl waxy maize starch ether or a hydroxypropyl tapioca starch ether having a degree of substitution of about 0.12 to 0.93.

17. The method of claim 6, wherein the starch ether has a degree of substitution of about 0.15 to 0.70.

18. The method of claim 6, wherein the starch ether has a degree of substitution of about 0.15 to 0.70.

19. The method of claim 10, wherein the starch derivative is a waxy maize starch acetyl starch ester or tapioca acetyl starch ester having a degree of substitution of about 0.07 to 0.25.

20. The method of claim 10, wherein the non-gelling starch derivative is prepared by reacting an acid-converted or oxidatively-converted waxy maize starch having water fluidity of about 30–65 with sufficient propylene oxide to give a hydroxypropyl starch ether having a degree of substitution of about 0.12 to 0.93.

21. An improved lipid-containing food, which contains some water at least during formulation of the food, wherein the improvement comprises the replacement of at least part of the lipid with an effective amount of a non-gelling granular or pregelatinized starch derivative having a degree of substitution sufficient to render the starch non-gelling and liquid or flowable when dispersed at 1–50% solids in water at 0°–100° C. and sufficient to impart an oily mouthfeel to the food.

22. The food of claim 21, wherein the amount of the non-gelling granular or pregelatinized starch derivative is about 0.01 to 100%.

23. The food of claim 22, wherein 25 to 100%, by weight, of the lipid is replaced with an aqueous dispersion of the non-gelling starch derivative.

24. The food of claim 21, wherein the lipid is replaced with an aqueous starch dispersion consisting essentially of 90–75%, by weight, water and 10–25%, by weight, of the non-gelling starch derivative.

25. The food of claim 24, wherein 100% of the lipid is replaced by the aqueous dispersion of the non-gelling starch derivative.

26. The food of claim 21, wherein the food is a dairy product, a baked good, or a frozen dessert.

27. The food of claim 21, wherein the food is selected from the group consisting of salad dressings, butter substitutes, low-fat spreads, puddings, sauces, gravies, soups, frostings and icings.

28. The food of claim 21, wherein the food is a spoonable food and wherein the non-gelling starch derivative is a non-gelling granular waxy maize or tapioca starch derivative which is converted prior to derivatization with propylene oxide.

29. The food of claim 21, wherein the food is a flowable food and wherein the non-gelling starch derivative is a non-gelling pregelatinized waxy maize or tapioca starch derivative which is converted prior to derivatization with propylene oxide.

30. The food of claim 21, wherein food is a liquid food and wherein the non-gelling starch derivative is a non-gelling pregelatinized waxy maize or tapioca starch derivative which is converted prior to derivatization with propylene oxide.

* * * * *